US008221562B2

United States Patent
Valdez et al.

(10) Patent No.: US 8,221,562 B2
(45) Date of Patent: Jul. 17, 2012

(54) COMPACT STRIP OR THIN SLAB PROCESSING OF BORON/TITANIUM STEELS

(75) Inventors: Martín Emiliano Valdez, Cindad Autónomoa de Buenos Aires (AR); Fernando Augusto Actis, Nuevo León (MX); Gerardo Puente Sireno, Nuevo León (MX); Marco Antonio Herrera García, Nuevo León (MX)

(73) Assignees: Maverick Tube, LLC, Houston, TX (US); Ternium Mexico, S.A. de C.V., San Nicolas de los Garza, Nuevo Leon (MX)

( * ) Notice: Subject to any disclaimer, the term of this patent is extended or adjusted under 35 U.S.C. 154(b) by 328 days.

(21) Appl. No.: 12/626,547

(22) Filed: Nov. 25, 2009

(65) Prior Publication Data

US 2010/0136363 A1    Jun. 3, 2010

Related U.S. Application Data

(60) Provisional application No. 61/118,402, filed on Nov. 26, 2008, provisional application No. 61/118,396, filed on Nov. 26, 2008, provisional application No. 61/118,392, filed on Nov. 26, 2008, provisional application No. 61/117,929, filed on Nov. 25, 2008.

(51) Int. Cl.
    *C21D 8/10*    (2006.01)
(52) U.S. Cl. ........ 148/541; 148/540; 148/519; 148/590; 164/459; 164/476
(58) Field of Classification Search .................. 148/541, 148/320, 330, 540, 519, 590; 420/126, 128, 420/121; 164/459, 476
See application file for complete search history.

(56) References Cited

U.S. PATENT DOCUMENTS

| 3,810,793 A | 5/1974 | Heller |
| 4,231,555 A | 11/1980 | Saito |
| 4,336,081 A | 6/1982 | Hijikata et al. |

(Continued)

FOREIGN PATENT DOCUMENTS

AR    0050159 A1    10/2006

(Continued)

OTHER PUBLICATIONS

A. Carboni, A. Pigani, G. Megahed, S. Paul, "Casting and rolling of API X 70 grades for artic application in a thin slab rolling plant", Stahl u Eisen, 2007, N° 1, p. 45-50.

(Continued)

*Primary Examiner* — Deborah Yee
(74) *Attorney, Agent, or Firm* — Knobbe, Martens, Olson & Bear, LLP

(57) ABSTRACT

A method for casting medium carbon, B/Ti steel product using compact strip processing or thin slab casting. The method can include providing a steel composition including boron and titanium and casting the steel composition into a slab having a thickness between about 25 and 150 mm. The slab can have a cast composition including about 0.23 to 0.30 wt. % carbon, about 0.0010 to 0.0050 wt. % boron, about 0.010 to 0.050 wt. % titanium, about 1.15 to 1.50 wt. % manganese, less than 0.35 wt. % silicon and a Ti/N ratio greater than 2.9. The amount of each element is provided based upon the total weight of the steel composition. The steel slab can be free from cracks and significant defects. Furthermore, the steel slab can be used for electric resistance welded (ERW) products.

13 Claims, 11 Drawing Sheets

U.S. PATENT DOCUMENTS

| | | | |
|---|---|---|---|
| 4,376,528 A | 3/1983 | Ohshimatani et al. | |
| 4,379,482 A | 4/1983 | Suzuki et al. | |
| 4,407,681 A | 10/1983 | Ina et al. | |
| 4,526,628 A | 7/1985 | Ohno et al. | |
| 4,721,536 A | 1/1988 | Koch et al. | |
| 4,814,141 A | 3/1989 | Imai et al. | |
| 5,352,406 A | 10/1994 | Barteri et al. | |
| 5,454,883 A | 10/1995 | Yoshie et al. | |
| 5,538,566 A | 7/1996 | Gallagher | |
| 5,592,988 A | 1/1997 | Meroni et al. | |
| 5,598,735 A | 2/1997 | Saito et al. | |
| 5,944,921 A | 8/1999 | Cumino et al. | |
| 6,030,470 A | 2/2000 | Hensger et al. | |
| 6,188,037 B1 | 2/2001 | Hamada et al. | |
| 6,196,530 B1 | 3/2001 | Muhr et al. | |
| 6,217,676 B1 | 4/2001 | Takabe et al. | |
| 6,267,828 B1 | 7/2001 | Kushida et al. | |
| 6,311,965 B1 | 11/2001 | Muhr et al. | |
| 6,384,388 B1 | 5/2002 | Anderson et al. | |
| 6,648,991 B2 | 11/2003 | Turconi et al. | |
| 6,669,285 B1 | 12/2003 | Park et al. | |
| 6,669,789 B1 * | 12/2003 | Edelman et al. | 148/320 |
| 6,682,610 B1 | 1/2004 | Inoue | |
| 6,767,417 B2 * | 7/2004 | Fujita et al. | 148/330 |
| 6,958,099 B2 | 10/2005 | Nakamura et al. | |
| 7,074,283 B2 | 7/2006 | Omura | |
| 7,083,686 B2 | 8/2006 | Itou | |
| 7,264,684 B2 | 9/2007 | Numata et al. | |
| 7,635,406 B2 | 12/2009 | Numata et al. | |
| 7,744,708 B2 | 6/2010 | López et al. | |
| 7,862,667 B2 | 1/2011 | Turconi et al. | |
| 8,002,910 B2 | 8/2011 | Tivelli et al. | |
| 8,007,601 B2 | 8/2011 | López et al. | |
| 8,007,603 B2 | 8/2011 | Garcia et al. | |
| 2002/0011284 A1 | 1/2002 | Von Hagen et al. | |
| 2003/0155052 A1 | 8/2003 | Kondo et al. | |
| 2004/0118490 A1 | 6/2004 | Klueh et al. | |
| 2004/0131876 A1 | 7/2004 | Ohgami et al. | |
| 2004/0139780 A1 | 7/2004 | Cai et al. | |
| 2005/0076975 A1 | 4/2005 | Lopez et al. | |
| 2005/0087269 A1 | 4/2005 | Merwin | |
| 2006/0169368 A1 | 8/2006 | Lopez et al. | |
| 2006/0243355 A1 | 11/2006 | Haiderer et al. | |
| 2007/0137736 A1 | 6/2007 | Omura et al. | |
| 2008/0047635 A1 | 2/2008 | Kondo et al. | |
| 2008/0129044 A1 | 6/2008 | Carcagno et al. | |
| 2008/0219878 A1 | 9/2008 | Konda et al. | |
| 2008/0226396 A1 | 9/2008 | Garcia et al. | |
| 2009/0101242 A1 | 4/2009 | Lopez et al. | |
| 2010/0068549 A1 | 3/2010 | Agazzi | |
| 2010/0136363 A1 | 6/2010 | Valdez et al. | |
| 2010/0193085 A1 | 8/2010 | Garcia | |
| 2010/0294401 A1 | 11/2010 | Gomez | |
| 2010/0319814 A1 | 12/2010 | Perez | |
| 2011/0097235 A1 | 4/2011 | Turconi et al. | |

FOREIGN PATENT DOCUMENTS

| | | |
|---|---|---|
| CN | 101613829 A | 12/2009 |
| EP | 0 092 815 | 11/1983 |
| EP | 0 658 632 | 6/1995 |
| EP | 0 753 595 | 1/1997 |
| EP | 0 828 007 A | 3/1998 |
| EP | 0 989 196 | 3/2000 |
| EP | 1027944 B1 | 8/2000 |
| EP | 1 277 848 | 1/2003 |
| EP | 1 288 316 | 3/2003 |
| EP | 1 413 639 | 4/2004 |
| EP | 1 717 324 | 11/2006 |
| EP | 2 028 284 | 2/2009 |
| JP | 60-086209 | 5/1985 |
| JP | 36025719 | 10/1985 |
| JP | 360215719 * | 10/1985 |
| JP | 61270355 | 11/1986 |
| JP | 63004046 A2 | 1/1988 |
| JP | 63004047 A2 | 1/1988 |
| JP | 63230847 A2 | 9/1988 |
| JP | 63230851 A2 | 9/1988 |
| JP | 01 259124 A2 | 10/1989 |
| JP | 01 259125 A2 | 10/1989 |
| JP | 01 283322 A2 | 11/1989 |
| JP | 05-098350 | 12/1990 |
| JP | 403006329 A | 1/1991 |
| JP | 04 021718 A2 | 1/1992 |
| JP | 04 107214 | 4/1992 |
| JP | 04 231414 A2 | 8/1992 |
| JP | 05 287381 A2 | 11/1993 |
| JP | 06-093339 | 4/1994 |
| JP | 06 172859 A2 | 6/1994 |
| JP | 07 041856 A2 | 2/1995 |
| JP | 07 197125 A2 | 8/1995 |
| JP | 08 311551 | 11/1996 |
| JP | 09 067624 A2 | 3/1997 |
| JP | 09-235617 | 9/1997 |
| JP | 10 140250 | 5/1998 |
| JP | 10176239 | 6/1998 |
| JP | 10 280037 A | 10/1998 |
| JP | 11 050148 A | 2/1999 |
| JP | 11140580 | 5/1999 |
| JP | 11229079 | 8/1999 |
| JP | 2000-063940 | 2/2000 |
| JP | 2000-313919 A2 | 11/2000 |
| JP | 2001-131698 | 5/2001 |
| JP | 2001-164338 | 6/2001 |
| JP | 2001-172739 A2 | 6/2001 |
| JP | 2001-271134 | 10/2001 |
| JP | 2002-096105 A2 | 4/2002 |
| JP | 2004-011009 | 1/2004 |
| JP | 60 174822 | 9/2005 |
| KR | 0245031 | 3/2000 |
| WO | WO 96/22396 | 7/1996 |
| WO | WO 00/70107 | 11/2000 |
| WO | WO 01/88210 | 11/2001 |
| WO | WO 03/033856 | 4/2003 |
| WO | WO 2004/031420 | 4/2004 |
| WO | WO 2004/097059 A1 | 11/2004 |
| WO | WO 2007/017161 | 2/2007 |
| WO | WO 2008/003000 | 1/2008 |
| WO | WO 2008/127084 A2 | 10/2008 |
| WO | WO 2009/044297 | 4/2009 |
| WO | WO 2010/061882 | 6/2010 |

OTHER PUBLICATIONS

G.Skoczylas, A.Dasgupta, R.Bommaraju, "Characterization of the chemical interactions during casting of High-titanium low carbon enameling steels", 1991 Steelmaking Conference Proceeding, pp. 707-717.

H. Todoroki, T. Ishii, K. Mizuno, A. Hongo, "Effect of crystallization behavior of mold flux on slab surface quality of a Ti-bearing Fe-Cr-Ni super alloy cast by means of continuous casting process", Materials Science and Engineering A, 2005, vol. 413-414, p. 121-128.

M. Bai, D. Liu, Y. Lou X. Mao, L. Li, X. Huo, "Effects of Ti addition on low carbon hot strips produced by CSP process", Journal of University of Science and Technology Beijing, 2006, vol. 13, N° 3, p. 230.

M. Nagata, J. Speer, D. Matlock, "Titanium nitride precipitation behavior in thin slab cast high strength low alloyed steels", Metallurgical and Materials Transactions A, 2002, vol. 33A, p. 3099-3110.

P.W. Johnston, G.Brooks, "Effect of Al2O3 and TiO2 Additions on the Lubrication Characteristics of Mould Fluxes", Molten Slags, Fluxes and Salts '97 Conference, 1997, pp. 845-850.

T.Kishi, H.Takeucgi, M.Yamamiya, H.Tsuboi, T.Nakano, T.Ando, "Mold Powder Technology for Continuous Casting of Ti-Stabilized Stainless Steels", Nippon Steel Technical Report, No. 34, Jul. 1987, pp. 11-19.

T.Mukongo, P.C.Pistorius, and A.M.Garbers-Craig, "Viscosity Effect of Titanium Pickup by Mould Fluxes for Stainless Steel", Ironmaking and Steelmaking, 2004, vol. 31, No. 2, pp. 135-143.

"Seamless Steel Tubes for Pressure Purposes-Technical Delivery Conditions-Part 1: Non-alloy Steel Tubes with Specified Room Temperature Properties" British Standard BS EN 10216-1:2002 E:1-26, published May 2002.

"Seamless Steel Tubes for Pressure Purposes-Technical Delivery Conditions-Part 2: Non-alloy and Alloy Steel Tubes with Specified Elevated Temperature Properties" British Standard BS EN 10216-2:2002+A2:2007:E:1-45, published Aug. 2007.
"Seamless Steel Tubes for Pressure Purposes-Technical Delivery Conditions-Part 3: Alloy Fine Grain Steel Tubes" British Standard BS EN 10216-3:2002 +A1:2004 E:1-34, published Mar. 2004.
"Seamless Steel Tubes for Pressure Purposes-Technical Delivery Conditions-Part 4: Non-alloy and Alloy Steel Tubes with Specified Low Temperature Properties" British Standard BS EN 10216-4:2002 + A1:2004 E:1-30, published Mar. 2004.
Aggarwal, R. K., et al.: "Qualification of Solutions for Improving Fatigue Life at SCR Touch Down Zone", Deep Offshore Technology Conference, Nov. 8-10, 2005, Vitoria, Espirito Santo, Brazil, in 12 pages.
Asahi, et al., Development of Ultra-high-strength Linepipe, X120, Nippon Steel Technical Report, Jul. 2004, Issue 90, pp. 82-87.
ASM Handbook, Mechanical Tubing and Cold Finishing, Metals Handbook Desk Edition, (2000), 5 pages.
Beretta, Stefano et al., "Fatigue Assessment of Tubular Automotive Components in Presence of Inhomogeneities", Proceedings of IMECE2004, ASME International Mechanical Engineering Congress, Nov. 13-19, 2004, pp. 1-8.
Berner, Robert A., "Tetragonal Iron Sulfide", Science, Aug. 31, 1962, vol. 137, Issue 3531, pp. 669.
Berstein et al.,"The Role of Traps in the Microstructural Control of Hydrogen Embrittlement of Steels" Hydrogen Degradation of Ferrous Alloys, Ed. T. Oriani, J. Hirth, and M. Smialowski, Noyes Publications, 1988, pp. 641-685.
Boulegue, Jacques, "Equilibria in a sulfide rich water from Enghien-les-Bains, France", Geochimica et Cosmochimica Acta, Pergamom Press, 1977, vol. 41, pp. 1751-1758, Great Britain.
Bruzzoni et al., "Study of Hydrogen Permeation Through Passive Films on Iron Using Electrochemical Impedance Spectroscopy", PhD Thesis, 2003, Universidad Nacional del Comahue de Buenos Aires, Argentina.
Cancio et al., "Characterization of microalloy precipitates in the austenitic range of high strength low alloy steels", Steel Research, 2002, vol. 73, pp. 340-346.
Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.
Clark, A. Horrell, "Some Comments on the Composition and Stability Relations of Mackinawite", Neues Jahrbuch fur Mineralogie, 1966, vol. 5, pp. 300-304, London, England.
Craig, Bruce D., "Effect of Copper on the Protectiveness of Iron Sulfide Films", Corrosion, National Association of Corrosion Engineers, 1984, vol. 40, Issue 9, pp. 471-474.
D.O.T. 178.65 Spec. 39, pp. 831-840, Non reusable (non refillable) cylinders, Oct. 1, 2002.
Davis, J.R., et al. "ASM—Speciality Handbook—Carbon and alloy steels" ASM Speciality Handbook, Carbon and Alloy Steels, 1996, pp. 12-27, XP002364757 US.
De Medicis, Rinaldo, "Cubic FeS, A Metastable Iron Sulfide", Science, American Association for the Advancement of Science, Steenbock Memorial Library, Dec. 11, 1970, vol. 170, Issue 3963, pp. 723-728.
Echaniz, "The effect of microstructure on the KISSC of low alloy carbon steels", NACE Corrosion '98, EE. UU., Mar. 1998, pp. 22-27, San Diego.
Echaniz, G., Morales, C., Perez, T., "Advances in Corrosion Control and Materials in Oil and Gas Production" Papers from Eurocorr 97 and Eurocorr 98, 13, P. S. Jackman and L.M. Smith, Published for the European Federation of Corrosion, No. 26, European Federation of Corrosion Publications, 1999.
Gojic, Mirko and Kosec, Ladislav, "The Susceptibility to the Hydrogen Embrittlement of Low Alloy Cr and CrMo Steels", ISIJ International, 1997, vol. 37, Issue 4, pp. 412-418.
Heckmann, et al., Development of low carbon Nb-Ti-B microalloyed steels for high strength large diameter linepipe, Ironmaking and Steelmaking, 2005, vol. 32, Issue 4, pp. 337-341.
Howells, et al.: "Challenges for Ultra-Deep Water Riser Systems", IIR, London, Apr. 1997, 11 pages.

Hutchings et al., "Ratio of Specimen thickness to charging area for reliable hydrogen permeation measurement", British Corrosion. Journal, 1993, vol. 28, Issue 4, pp. 309-312.
Iino et al., "Aciers pour pipe-lines resistant au cloquage et au criquage dus a l'hydrogene", Revue de Metallurgie, 1979, vol. 76, Issue 8-9, pp. 591-609.
Ikeda et al., "Influence of Environmental Conditions and Metallurgical Factors on Hydrogen Induced Cracking of Line Pipe Steel", Corrosion/80, National Association of Corrosion Engineers, 1980, vol. 8, pp. 8/1-8/18, Houston, Texas.
Izquierdo, et al.: "Qualification of Weldable X65 Grade Riser Sections with Upset Ends to Improve Fatigue Performance of Deepwater Steel Catenary Risers", Proceedings of the Eighteenth International Offshore and Polar Engineering Conference, Vancouver, BC, Canada, Jul. 6-11, 2008, p. 71.
Keizer, Joel, "Statistical Thermodynamics of Nonequilibrium Processes", Spinger-Verlag, 1987.
Korolev, D. F., "The Role of Iron Sulfides in the Accumulation of Molybdenum in Sedimentary Rocks of the Reduced Zone, Geochemistry", 1958, vol. 4, pp. 452-463.
Lee, Sung Man and Lee, Jai Young, "The Effect of the Interface Character of TiC Particles on Hydrogen Trapping in Steel", Acta Metall., 1987, vol. 35, Issue 11, pp. 2695-2700.
Mishael, et al., "Practical Applications of Hydrogen Permeation Monitoring," Corrosion, Mar. 28-Apr. 1, 2004, Corrosion 2004, Nacional Association of Corrosion Engineers, vol. Reprint No. 04476.
Morice et al., "Moessbauer Studies of Iron Sulphides", J. lnorg. Nucl. Chem., 1969, vol. 31, pp. 3797-3802.
Mullet et al., "Surface Chemistry and Structural Properties of Mackinawite Prepared by Reaction of Sulfide Ions with Metallic Iron", Geochemica et Cosmochemica Acta, 2002, vol. 66, Issue 5, pp. 829-836.
Murcowchick, James B. and Barnes, H.L., "Formation of a cubic FeS", American Mineralogist, 1986, vol. 71, pp. 1243-1246.
Nakai et al., "Development of Steels Resistant to Hydrogen Induced Cracking in Wet Hydrogen Sulfide Environment", Transactions of the ISIJ, 1979, vol. 19, pp. 401-410.
Pressure Equipment Directive 97/23/EC, May 29, 1997, downloaded from website:http://ec.europa.eu/enterprise/pressure_equipment/ped/index_en.html on Aug. 4, 2010.
Prevéy, Paul, et al., "Introduction of Residual Stresses to Enhance Fatigue Performance in the Initial Design", Proceedings of Turbo Expo 2004, Jun. 14-17, 2004, pp. 1-9.
Rickard, D.T., "The Chemistry of Iron Sulphide Formation at Low Tempuratures", Stockholm Contrib. Geol., 1969, vol. 26, pp. 67-95.
Riecke, Ernst and Bohnenkamp, Konrad, "Uber den Einfluss von Gittersoerstellen in Eisen auf die Wassersroffdiffusion", Z. Metallkde.., 1984, vol. 75, pp. 76-81.
Shanabarger, M.R. and Moorhead, R. Dale, "H2O Adsorption onto clean oxygen covered iron films", Surface Science, 1996, vol. 365, pp. 614-624.
Shoesmith, et al., "Formation of Ferrous Monosulfide Polymorphs During Corrosion of Iron by Aqueous Hydrogen Sulfide at 21 degrees C", Journal of the Electrochemical Society, 1980, vol. 127, Issue 5, pp. 1007-1015.
Spry, Alan, "Metamorphic Textures", Perganom Press, 1969, New York.
Taira et al., "HIC and SSC Resistance of Line Pipes for Sour Gas Service, Nippon Kokan Technical Report", 1981, vol. 31, Issue 1-13.
Taira et al., "Study on the Evaluation of Environmental Condition of Wet Sour Gas", Corrosion 83 (Reprint. No. 156, National Association of Corrosion Engineers), 1983, pp. 156/2-156/13, Houston, Texas.
Takeno et al., "Metastable Cubic Iron Sulfide—With Special Reference to Mackinawite", American Mineralogist, 1970, vol. 55, pp. 1639-1649.
Tenaris Newsletter for Pipeline Services, Apr. 2005, p. 1-8.
Tenaris Newsletter for Pipeline Services, May 2003, p. 1-8.
Thethi, et al.: "Alternative Construction for High Pressure High Temperature Steel Catenary Risers", OPT USA, Sep. 2003, p. 1-13.
Thewlis, G., Weldability of X100 linepipe, Science and Technology of Welding and Joining, 2000, vol. 5, Issue 6, pp. 365-377.

U.S. Appl. No. 13/031,131, filed Feb. 18, 2011 and its ongoing prosecution history, including without limitation Office Actions, Amendments, Remarks, and any other potentially relevant documents.

U.S. Appl. No. 13/031,133, filed Feb. 18, 2011 and its ongoing prosecution history, including without limitation Office Actions, Amendments, Remarks, and any other potentially relevant documents.

Vaughan, D. J. and Ridout, M.S., "Moessbauer Studies of Some Sulphide Minerals", J. Inorg Nucl. Chem., 1971, vol. 33, pp. 741-746.

Wegst, C.W., "Stahlüssel", Auflage 1989, Seite 119, 2 pages.

* cited by examiner

COMPACT STRIP OR THIN SLAB PROCESSING OF BORON/TITANIUM STEELS

CROSS-REFERENCE TO RELATED APPLICATIONS

This application claims the benefit of U.S. Provisional Application Nos. 61/118,402, filed Nov. 26, 2008, 61/118,396, filed Nov. 26, 2008, 61/118,392, filed Nov. 26, 2008 and 61/117,929, filed Nov. 25, 2008, the entirety of each of which is hereby incorporated by reference.

BACKGROUND OF THE INVENTION

1. Field

Embodiments of the present invention relate to methods of casting medium carbon, boron/titanium steels free from cracks and significant defects using compact strip processing or thin slab casting. Further embodiments relate to B/Ti steels, and in particular, to B/Ti steels for electric resistance welded (ERW) products.

2. Description of the Related Art

Steels containing boron and titanium, also referred to interchangeably as B/Ti steels, are desirable because boron and titanium result in the improvement of the mechanical properties of heat treated steels. For example, the right combination of boron, titanium in steels improves hardenability. Hardenability improvement is reflected in the formation of elevated martensite contents. However, boron can also react with oxygen, carbon, and nitrogen to form undesirable boron containing compounds, including but not limited to boron oxide and boron nitride. When boron forms these other compounds, the positive effect of boron on improving hardenability may be reduced.

B/Ti steels can be used in a wide variety of applications such as wear resistant materials and high strength structural materials. Specific examples include, but are not limited to, knives, saw blades, punching tools, and pipes. B/Ti steels are often desirable for use in these applications because they are often less expensive than alloy steels of equivalent hardenability, and also the improved hardenability can guarantee a better process control as well as product quality. B/Ti steels are often produced commercially using conventional continuous casting machines (CCC) without major problems. However, casting of thin slabs of B/Ti steels have been expected to encounter difficulties, for example, cracks in the slab.

SUMMARY

In an embodiment, a carbon steel composition having additives of boron and titanium is provided. The steel composition may be made by employing one or more of an electric arc furnace for melting of scrap and pre-reduced iron, a ladle furnace to perform so called "secondary metallurgy" (e.g maintain the temperature of the liquid steel, sulphur removal, chemistry adjustment, calcium treatment, inclusion removal, etc.) and a thin slab caster to cast the liquid steel into a slab. Selected casting parameters, including, but not limited to, tundish steel temperature, mold liquid steel level, casting rate, primary cooling in the mold and secondary cooling after the steel exits the mold including the use of air mist, temperature change on mold water, mold friction, stopper rod or slide gate position, are monitored and maintained within selected ranges during the casting process. The mold powder composition may also be provided within selected limits in order to protect the steel from re-oxidation, insulate the liquid steel, capture inclusions, lubricate the mold wall, regulate heat transfer and inhibit substantial chemical interactions between the mold powder and the constituents of the liquid steel, in particular those with an elevated oxidation potential (e.g aluminum, titanium, etc). In this manner, the steel composition may be cast using compact strip processing or thin slab casting, with the steel composition selected such that the steel slabs and resulting coils may be free or substantially free from cracks or other structural defects. In certain embodiments, the steel composition comprises a medium carbon steel having a carbon content within the range of about 0.2 to 0.30 wt. % on the basis of the total weight of the composition.

In one embodiment, a method of manufacturing a steel product includes providing a steel composition comprising boron and titanium and casting the steel composition into a slab having a thickness between about 25 and 150 mm. The slab has a cast composition comprising about 0.23 to 0.30 wt. % carbon, about 0.0010 to 0.0050 wt. % boron, about 0.010 to 0.050 wt. % titanium, about 1.15 to 1.50 wt. % manganese, less than about 0.35 wt. % silicon, and a Ti/N ratio greater than about 2.9. The amount of each element is provided based upon the total weight of the cast composition. The cast composition may also further comprise about 0.010 to 0.070 wt. % aluminum. In some embodiments, the steel slab has a thickness between 30 to 100 mm. In one embodiment, the composition is selected so that the steel slab after casting is substantially free from cracks or significant defects.

In certain embodiments, the cast steel composition comprises or consists essentially of about 0.23 to 0.29 wt. % carbon, about 0.001 to 0.005 wt. % boron, about 0.010 to 0.045 wt. % titanium, about 1.15 to 1.50 wt. % manganese, less than 0.35 wt. % silicon, less than 0.025 wt. % phosphorus, less than 0.01 wt. % sulfur, about 0.010 to 0070 wt. % aluminum, less than 0.010 wt. % nitrogen, less than 0.2 wt. % nickel, less than 0.2 wt. % chromium, less than 0.11 wt. % molybdenum, less than 0.01 wt. % vanadium, less than 0.01 wt. % niobium, less than 0.005 wt. % calcium, less than 0.25 wt. % copper, less than 0.02 wt. % tin, and a Ti/N ratio greater than 2.9. The amount of each element is provided based upon the total weight of the cast composition.

In another embodiment, the cast steel composition consists essentially of about 0.23 to 0.30 wt. % carbon, about 0.001 to 0.005 wt. % boron, about 0.010 to 0.050 wt. % titanium, about 1.15 to 1.50 wt. % manganese, less than 0.35 wt. % silicon, and the balance being iron and incidental impurities, with a Ti/N ratio greater than about 2.9. The amount of each element is provided based upon the total weight of the steel composition. In another embodiment, the cast steel composition consists essentially of about 0.23 to 0.30 wt. % carbon, about 0.001 to 0.005 wt. % boron, about 0.010 to 0.050 wt. % titanium, about 1.15 to 1.50 wt. % manganese, about 0.010 to 0070 wt. % aluminum, less than 0.35 wt. % silicon, and the balance being iron and incidental impurities, with a Ti/N ratio greater than about 2.9.

In certain embodiments, a method comprises forming the slab into a pipe. The forming the slab into a pipe can include a welding operation. In other embodiments, a welded steel pipe can include a cast composition including about 0.23 to 0.30 wt. % carbon, about 0.001 to 0.005 wt. % boron, about 0.010 to 0.050 wt. % titanium, about 1.15 to 1.50 wt. % manganese, less than about 0.35 wt. % silicon, and a Ti/N ratio greater than about 2.9. The amount of each element is provided based upon the total weight of the cast composition.

DETAILED DESCRIPTION OF THE PREFERRED EMBODIMENTS

Compared to conventional continuous casting (CCC), other casting techniques, such as compact strip process and thin slab caster, are expected to encounter difficulties with casting B/Ti steels. For example, B/Ti steels may tend to be more prone to cracking, due to precipitants of boron nitride and titanium nitride occurring in these processes, increased hardenability that may generate stress conditions, the presence of elements that can interact with the mold powder, etc. Furthermore, the compact strip process usually involves casting a slab with a thickness that is less than CCC and casting at a greater rate than CCC. Therefore, compact strip processes may be more sensitive to problems of heat transfer in the casting mold than CCC process. In addition, because there is no opportunity for slab conditioning before rolling, surface quality problems that originate at mold or slab levels cannot be fixed. Thus, since B/Ti steels are more prone to cracking, B/Ti steels produced from compact strip process are expected to have severe cracking and possibly breakouts during casting. Breakouts happen when liquid steel in the core of the cast slab leaks out through a break in the solidified surface of the cast slab. However, if cracking and breakouts can be reduced or inhibited during compact strip process casting of B/Ti steels, the cost of producing these steels may be reduced significantly, and increase the possible products by casting with compact strip process as compared to CCC casting.

Embodiments of the present disclosure provide compositions and manufacturing methods for the fabrication of B/Ti steels and pipes therefrom. In certain embodiments, these B/Ti steels can replace steels that are currently used for electric resistance welded (ERW) heat treated products. These B/Ti steel chemistries have been developed in order to minimize defects associated with steels that include, for example, higher carbon or alloying elements, to provide sufficient hardenability, and to improve the overall quality of ERW heat treated products.

In certain embodiments of the steel compositions and slabs or articles formed therefrom disclosed herein, the carbon level of the steel is maintained within the range of medium carbon steels. Such a carbon range may be suitable for post-casting processing operations, such as electric arc welding. In certain embodiments, the carbon level of the steel may range between about 0.2 to 0.29 wt. % on the basis of the total weight of the steel composition. Strong nitride and oxide formers, such as titanium, aluminum and zirconium, may be added to the steel composition in order to prevent boron nitrides and boron oxides from forming. The resulting benefit of adding titanium to boron containing steel, at least in part, is improved hardenability.

Figure 1:
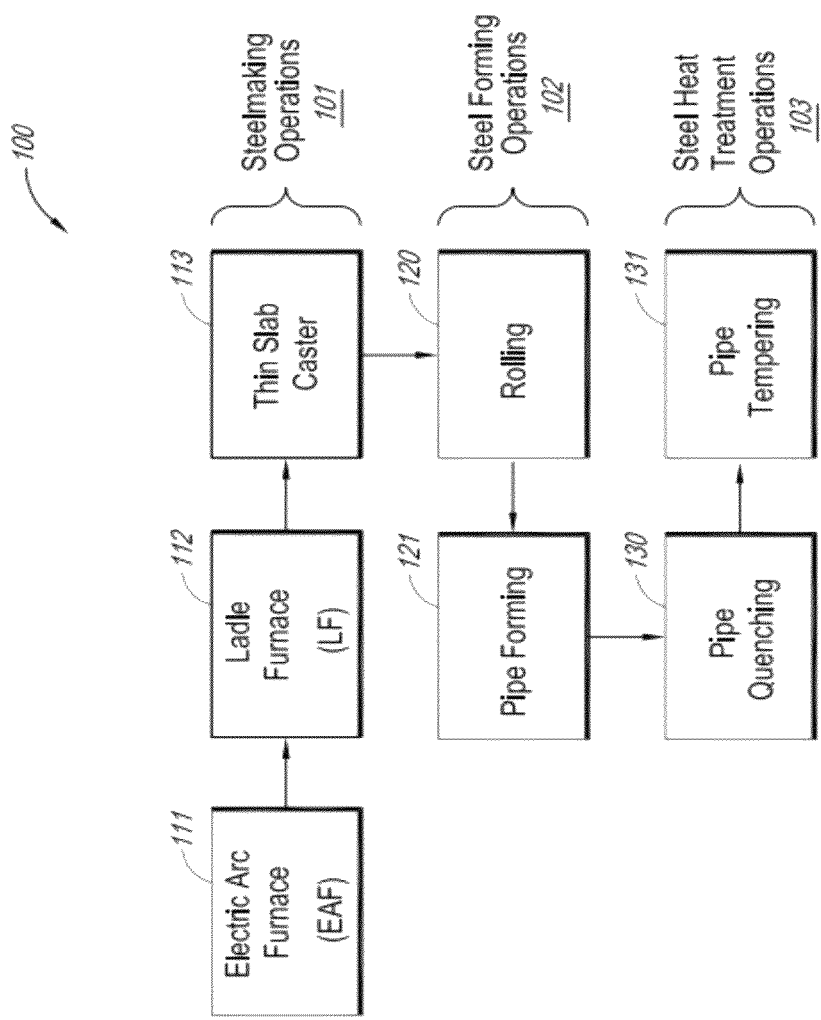
FIG. 1 illustrates one embodiment of a method of producing a B/Ti steel pipe by compact strip processing.

FIG. 1 illustrates one embodiment of a method 100 of producing B/Ti steel pipe. The method illustrated in FIG. 1 includes steelmaking operations in blocks 111, 112, and 113, collectively referred to as steelmaking operations 101, steel forming operations in blocks 120, 121, collectively referred to as steel forming operations 102, and steel heat treatment operations in blocks 130 and 131, collectively referred to as heat treatment operations 103. Before heat treatment operations 103, a green pipe can be obtained with excellent surface quality. It can be appreciated that the steps of the method 100 can be performed in a different order than that illustrated in FIG. 1 and steps can be omitted or additional steps can be added, as necessary.

The B/Ti steel is produced using steelmaking operations 101. The steelmaking operation 101 can include steelmaking (e.g., dephosphorization, decarburization, desulphurization, and purification) and casting processes employing an electric arc furnace (EAF) 111, ladle furnace (LF) 112, and a thin slab caster 113. Other steelmaking processes could be used such a basic oxygen converter, tank degasser, etc.

An EAF 111 is used to melt a metallic charge which can include pre-reduced iron ore and/or reduce iron from iron ore. In some embodiments, the metallic charge includes 100 to 70% sponge iron and the remaining 0-30% scrap. An electric arc between electrodes is formed to generate heat. Oxygen, lime and other materials are added to combine with impurities in the iron ore and form a slag. The resulting liquid iron is separated from the slag by pouring out the liquid iron through a tapping hole. The EAF 111 process can be repeated to further decrease impurities.

An LF 112 can be used to maintain the temperature of the liquid steel after the liquid steel is removed from the EAF 111. In addition, the LF 112 is beneficial for maintaining the temperature of the liquid steel if a delay occurs during the steel making operations 101. The LF 112 can use electrodes for arc heating to control the temperature of the liquid steel. Additional steelmaking operations can be performed in the LF 112, such as sulphur removal, chemistry adjustment, calcium treatment, inclusion removal, etc. For B/Ti steels, the liquid steel can be held between approximately 1,510 and 1,595° C.

Figure 2:
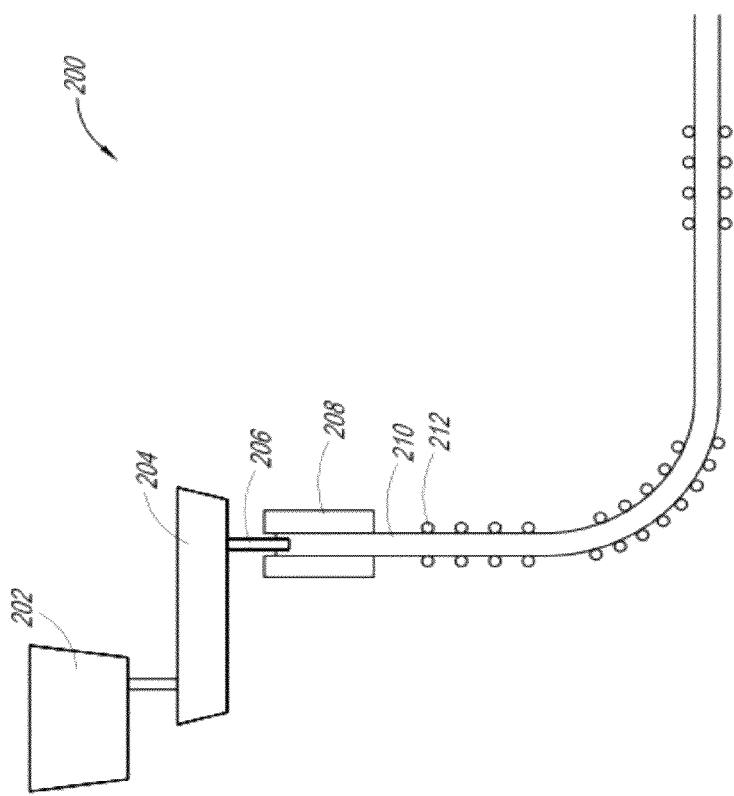
FIG. 2 illustrates one embodiment of a method of thin slab casting a B/Ti steel.

A thin slab caster 113 can be used to continuous cast the liquid steel into a slab. FIG. 2 illustrates one embodiment of a method 200 of casting B/Ti steel with a thin slab caster. Liquid steel is poured or transported from a ladle 202 into a tundish 204. In certain embodiments, the tundish steel temperature is 1,510 to 1,595° C. A tundish covering powder can be placed on top of the steel in the tundish 204, which can be used to thermally insulate, prevent oxidation and/or assimilate inclusions that separate from the steel. For example, Calcium Aluminates can be used as the tundish powder coverage. The tundish 204 has at least one nozzle 206 in the bottom where liquid steel flows out and into a mold 208. In certain embodiments, the nozzle 206 is a funnel type design. A stopper rod or slide gate can be used to control the flow rate through the nozzle 206. The stopper rod or slide gate can have a design which does not clog. The temperature of the liquid steel can be about 1,530 to 1,560° C. as it enters the mold 208. The mold 208 can be water-cooled copper with dimensions about similar to desired dimensions of a cast slab. The temperature of the mold 208 can be about 400° C. in the meniscus zone. A mold powder can be placed onto top of the liquid steel in the mold to prevent heat loss, reduce re-oxidation due to contact with the environment, trap inclusions, and to lubricate between the solidifying steel and the mold. When the cast slab 210 exits the mold, it is supported by a grid (not shown in FIG. 2) and then with rolls 212. The general thickness of the steel slab is between about 25 mm and 150 mm (about 1 to 6 inches) and more preferably about 30 to 100 mm. The width of the slab can be about 915 to 1,370 mm. The steel level in the mold can be controlled so that there is substantially no instability or no instability. In certain embodiments, the steel level in the mold has an average variation of less than 1.5 mm.

The variables that are controlled during the process can include, but are not limited to steel temperature, casting rate, mold powder composition and properties, taper, mold design, mould heat extraction rate, secondary cooling, submerged entry nozzle design, etc. In certain embodiments, the casting rate is about 4.3 m/min. In further embodiments, the casting rate is about 3.8 to 6 m/min. In certain embodiments, the casting rate is about 1.5 to 3.5 tons/min. Secondary cooling can be used after the slab exits the mold. In certain embodiments, an air mist secondary cooling is used. The control of this group of variables can allow the production of a B/Ti steel with the desired chemistry, as well as excellent external and internal quality. In addition, the steel slab can go through reducing rolls to reduce the thickness of the cast slab. After the thickness of the steel slab is reduced, it can be rolled into a coil.

In one embodiment, the cast steel comprises a composition in the ranges illustrated in Table I. For compositions provided throughout this specification, it will be appreciated that the compositions may have the exact values or ranges disclosed, or the compositions may be approximately or about that of the values or ranges provided. In some embodiments, B/Ti steels may include a medium carbon (C)-manganese (Mn) steel that includes: 0.20 to 0.30 wt. % C, 1.1 to 1.5 wt. % Mn, 0.010 to 0.050 wt. % Titanium (Ti) and 0.001 to 0.005 wt. % Boron (B), with limited Nitrogen (N) content. In certain embodiments, the N content is limited to less than 0.005 wt. %. N content is limited so that the B will be substantially chemically unbonded. Unbonded B can interchangeably be referred to as "free boron". The presence of free boron can be achieved by using Ti to chemically bond the N to Ti. The presence of "Free Boron," for example in the range of 0.001 to 0.005 wt. %, can be achieved when the wt. % ratio between Ti and N is selected to be greater than 2.9 or about 2.9. B/Ti steels may also include other elements.

As illustrated in Table I, the cast steel composition comprises not only carbon (C), boron (B) and titanium (Ti) but also preferably manganese (Mn), silicon (Si) and aluminum (Al). Impurities of sulfur (S), phosphorous (P) and nitrogen (N) may be present; however, the concentration of these impurities, in one embodiment, is preferably reduced to an amount as low as possible. In one embodiment, the concentration of N should be limited so that the wt. % ratio between Ti and N is greater than 2.9 or about 2.9. Generally, the cast steel composition can be about the same as the liquid steel composition in the mold. In certain embodiments, the cast steel composition consists essentially of the general or specific ranges (if shown) in Table I, with the balance being iron and incidental impurities.

TABLE I

Steel composition range (wt. %) after steelmaking operations.

| Element (wt. %) | Composition Range | | | |
| --- | --- | --- | --- | --- |
| | General | | Specific | |
| | Minimum | Maximum | Minimum | Maximum |
| C | 0.20 | 0.30 | 0.20 | 0.29 |
| Mn | 1.15 | 1.50 | 1.15 | 1.50 |
| Si | 0 | 0.35 | 0 | 0.35 |
| P | | | 0 | 0.025 |
| S | | | 0 | 0.01 |
| Al | | | 0.010 | 0.070 |
| Ti | 0.010 | 0.050 | 0.010 | 0.045 |
| B | 0.001 | 0.005 | 0.001 | 0.005 |
| N | | | 0 | 0.010 |
| Ni | | | 0 | 0.2 |
| Cr | | | 0 | 0.2 |
| Mo | | | 0 | 0.11 |
| V | | | 0 | 0.01 |
| Nb | | | 0 | 0.01 |
| Ca | | | 0 | 0.005 |
| Cu | | | 0 | 0.25 |
| Sn | | | 0 | 0.02 |
| Ratio Ti/N | >2.9 | | >2.9 | |

C is an element whose addition inexpensively raises the strength of the steel. If the C content is less than about 0.2 wt. %, it may be in some embodiments difficult to obtain the strength desired in the steel. On the other hand, the maximum C content is limited to 0.5% to allow a rolling mill to properly roll the steel into coils, and to allow cold formability. The general C content range is preferably about 0.20 to 0.30 wt. %. A preferred range for the C content is about 0.20 to 0.29 wt. %.

B is an element whose addition is effective in increasing the hardenability of the steel. If the B content is less than about 0.001 wt. % it may be difficult in some embodiments to obtain the desired hardenability of the steel. However, in some embodiments, if the B content is too high, workability of the steel decreases. Accordingly, the general B content range is about 0.001 to 0.005 wt. %.

Ti is an element whose addition is effective in increasing the effectiveness of B in the steel. If the Ti content is too low it may be difficult in some embodiments to obtain the desired hardenability of the steel. However, in some embodiments, if the Ti content is too high, workability of the steel decreases. Accordingly, the general Ti content range is about 0.010 to 0.050 wt. %. However, a preferred Ti range is about 0.010 to 0.045 wt. %.

N is an element that causes the toughness and workability of the steel to decrease. Accordingly, the general N content of the steel in some embodiments is limited to a maximum of about 0.010 wt. %. Ti decreases the formation of boron nitrides and boron oxides. Therefore, the general Ti/N wt. % ratio is greater than 2.9 or about 2.9 and is selected to minimize boron nitride and/or boron oxide formation.

Mn is an element whose addition is effective in increasing the hardenability of the steel, increasing the strength and toughness of the steel. If the Mn content is too low it may be difficult in some embodiments to obtain the desired strength in the steel. However, if the Mn content is too high, in some embodiments banding structures become marked, and toughness decreases. Accordingly, the general Mn content range is about 1.15 to 1.50 wt. %.

Si is an element whose addition has a deoxidizing effect during steel making process and also raises the strength of the steel. If the Si content is too low, the steel in some embodiments may be susceptible to oxidation, with a high level of micro-inclusions. On the other hand, though, if the Si content of the steel is too high, in some embodiments both toughness and formability of the steel decrease. Therefore, the general Si content range is about 0 to 0.35 wt. %.

Al is an element whose addition to the steel during the steel making process removes oxygen by forming aluminum oxide inclusions which transport to a top slag and can then be removed at the LF 112. The general Al content range is about 0.01 to 0.07 wt. %.

P is an element that causes the toughness and workability of the steel to decrease. Accordingly, the general P content of the steel in some embodiments is limited to a maximum of about 0.025 wt. %.

S is an element that causes the toughness and workability of the steel to decrease. Accordingly, the general S content of the steel in some embodiments is limited to a maximum of about 0.01 wt. %.

To examine the steel making process, a heat of approximately 100-120 tons was made. The B/Ti heats were scheduled after heats with similar carbon content in order to avoid an unnecessary change in mold powder or casting conditions. In order to evaluate chemical composition variations, lollypop samples were taken after tapping, during secondary metallurgy and in the thin slab caster. The analysis on the lollypop samples included spectrometric determination of chemical composition as well as C by combustion analysis and N by a LECO® analyzer utilizing a thermal conductivity cell based on a Wheatstone bridge. Slag samples were also removed.

Figure 3:
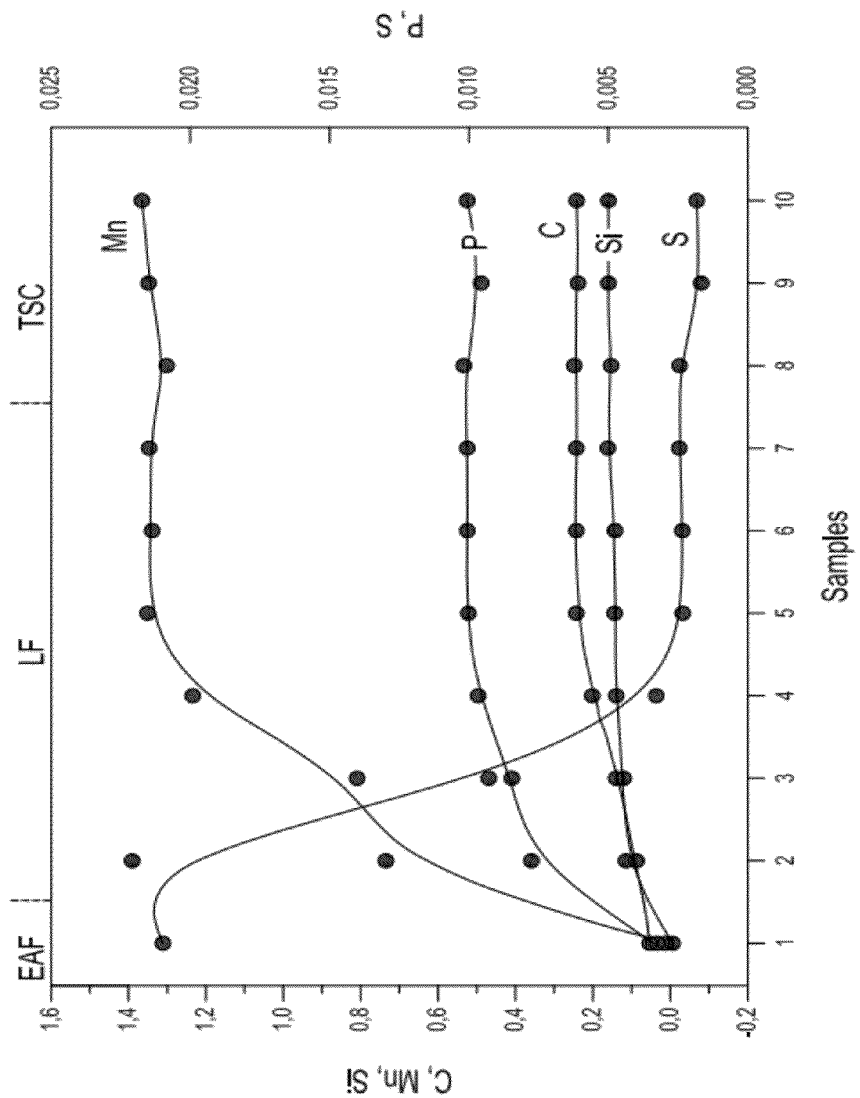
FIG. 3 is a plot illustrating the chemical composition of C, Mn, and Si of one embodiment as function of Ti/B steel making process.
Figure 4:
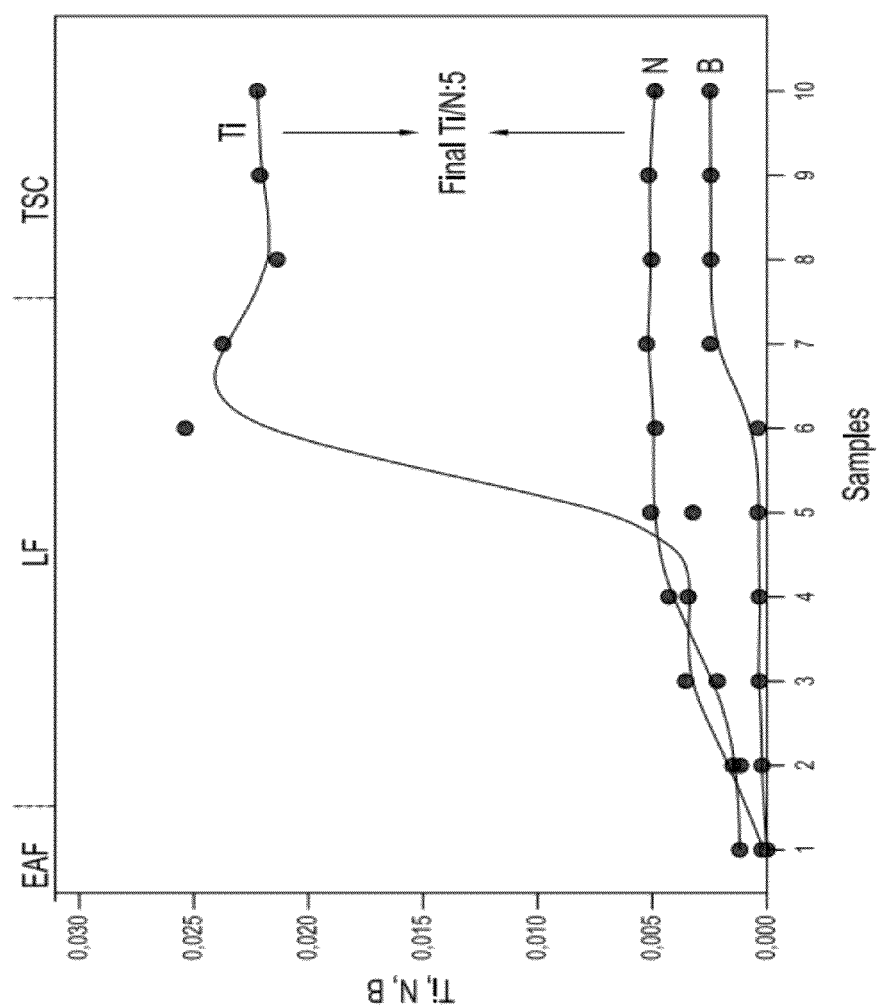
FIG. 4 is a plot illustrating the chemical composition of Ti, N, and B of one embodiment as function of Ti/B steel making process.

Samples were taken during the steelmaking operations, and the evolution of chemical composition during the steelmaking operations is illustrated in FIGS. 3 and 4. FIG. 3 illustrates the evolution of C, Mn, Si, P and S concentrations for the 10 samples per heat, while FIG. 4 illustrates the evolution of Ti, N and B concentrations as a function of the samples per heat. Sample 1 was taken at EAF 111 tapping, samples 2 through 7 were taken during LF 112, and samples 8 through 10 were taken during thin slab caster 113.

It may be observed in FIGS. 3 and 4 that the concentrations of impurity elements (S, P, N) were decreased or maintained below desired concentration amounts of Table I. As illustrated in FIG. 3, S underwent a significant decrease in concentration during the desulphurization at the LF process. From samples 1 to 4, the concentration of S dropped from about 0.020 to about 0.002 wt. %, where S stabilized at equilibrium around sample 5. In addition, although P and N concentrations were observed to have increased, from about 0.002 to 0.010 wt. % and about 0 to 0.005 wt. %, respectively, over samples 1-10, they did not increase above the maximum amount indicated in Table I.

The concentrations of B, Ti, Mn, C, and Si were also observed to increase to within the concentration range illustrated in Table I. For example, over samples 1-10, pronounced increases in Mn and Ti concentration are observed, while more modest increases in C, Si, B. The final wt. % Ti/N ratio was about 5 reaching the target of being above 2.9.

Sponge iron ranging from approximately 100% to 70% was used as a metallic charge to the EAF 111 in order to provide a low N content. A low N content decreases the formation of boron nitrides, allowing boron to be "free" to improve hardenability in the final product. The composition was inside the range shown in Table I.

In one embodiment, mold powder can be used during the thin slab caster 113 casting process. A mold powder may comprise a powder or granular material that is added to the top of molten steel in the continuous casting mold. The mold powder may partially melt, forming a liquid layer next to the molten steel. This molten mold powder, also referred to as a mold flux, may protect the steel from re-oxidation, absorb non-metallic inclusions, lubricate the steel shell as it passes through the mold, and assist in providing control over the heat transfer from the solidifying steel shell to the mold. Notably, however, the mold powder and the steel can chemically react, and as a consequence the composition of the steel and the mold powder could be modified in different degrees. Therefore in order to avoid mold powder transition, embodiments of the mold powder used during casting can include calcium aluminate.

Figure 5:
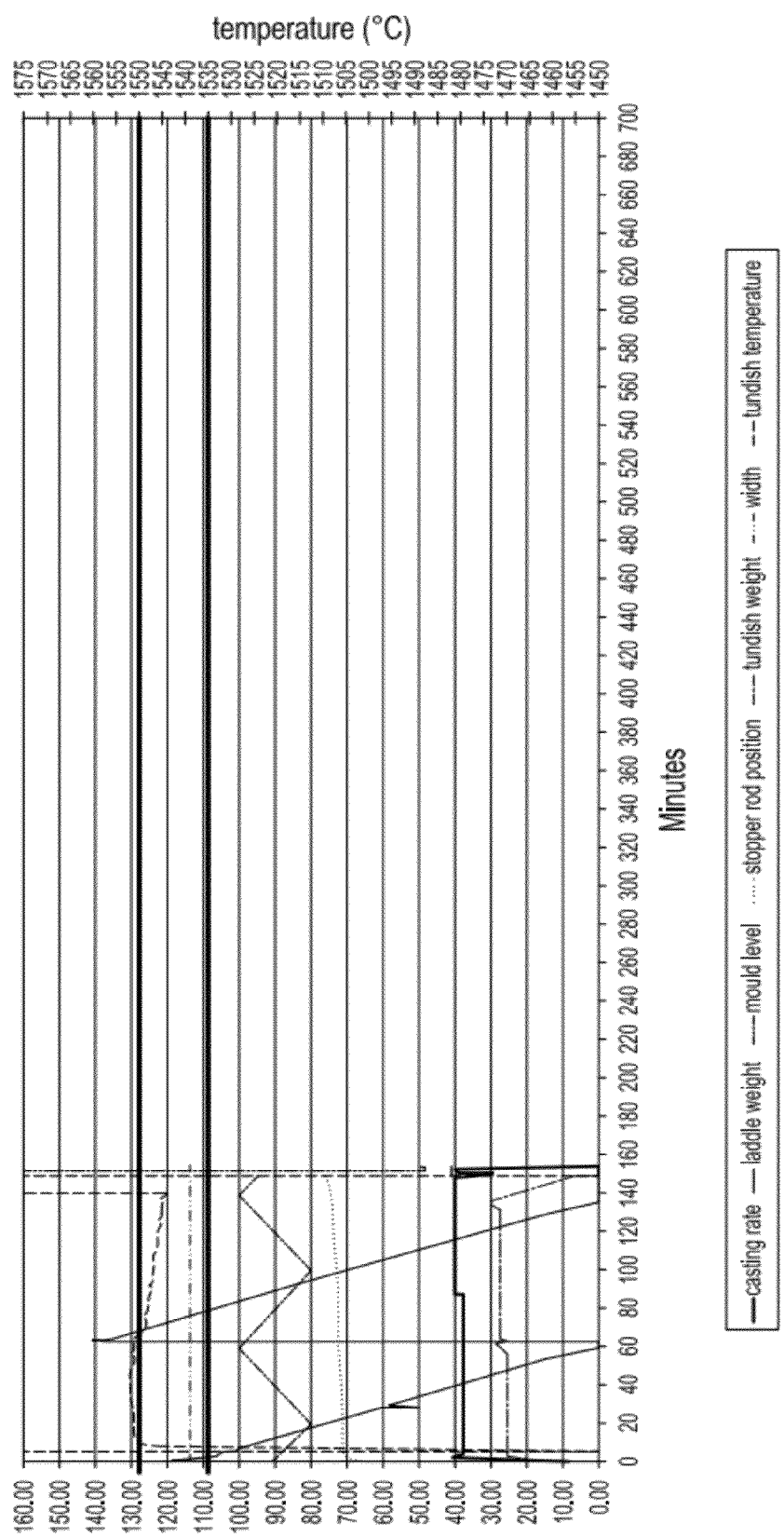
FIG. 5 is a plot illustrating process variables of casting rate (decimeters/minute), ladle weight (tons), mold level (millimeters to the top of the mold), stopper rod position (millimeters), tundish weight (tons), slab width (centimeters) and tundish temperature (Celsius) as a function of time during embodiments of steel casting operations for Ti/B steel of the present disclosure.

During thin slab caster 113 casting, the mold process variables were monitored: tundish temperature, liquid steel level, casting rate, ΔT of mold water and stopper rod position. FIG. 5 plots the casting rate (decimeters/minute), ladle weight (tons), mold level (millimeters to the top of the mold), stopper rod position (millimeters), tundish weight (tons), slab width (centimeters) and tundish temperature (Celsius) as a function of time.

Figure 6:
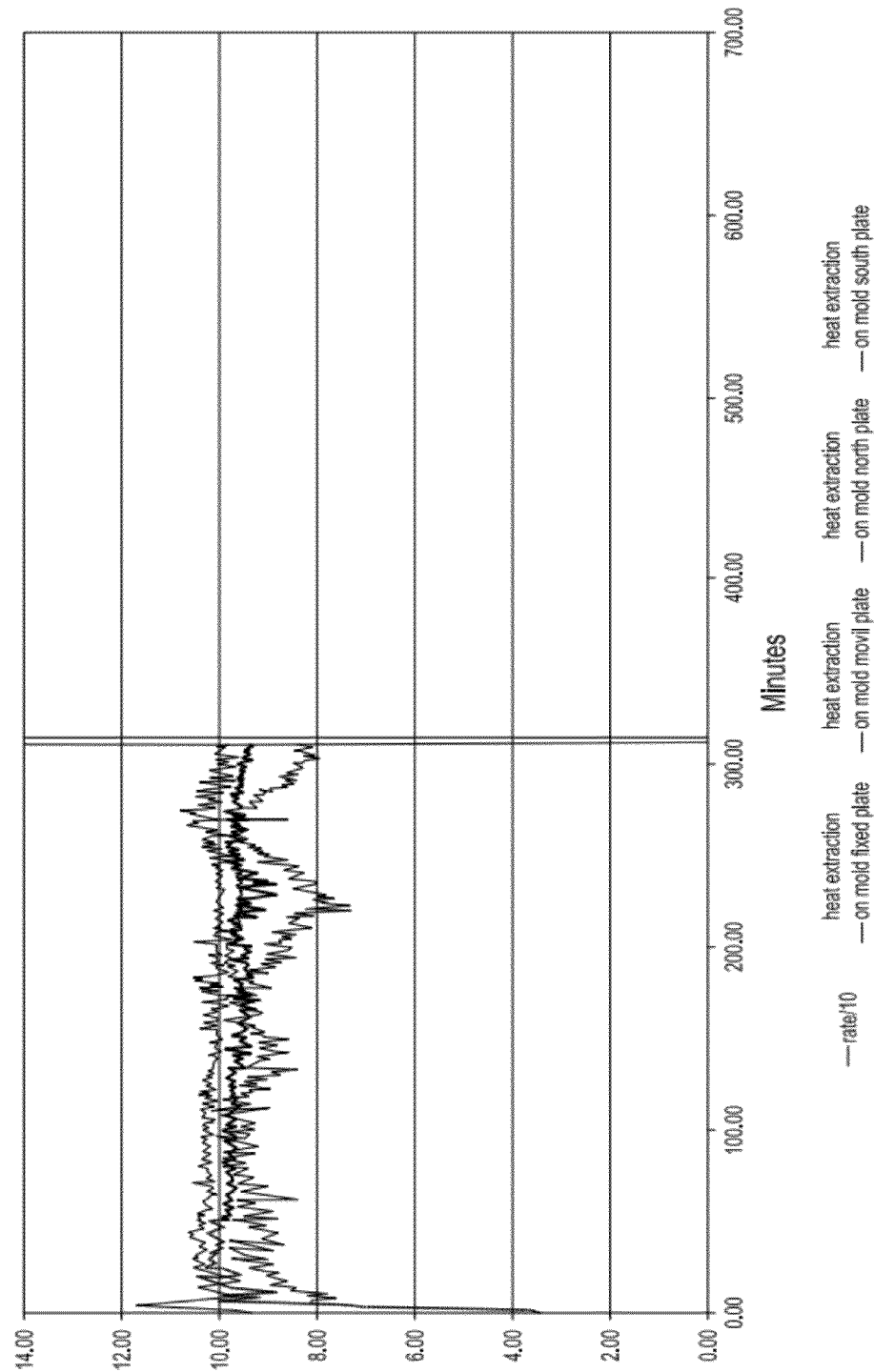
FIG. 6 is a plot of a first casting sequence illustrating the heat extraction of the mold as a function of time during embodiments of steel casting operations for Ti/B steel of the present disclosure.
Figure 7:
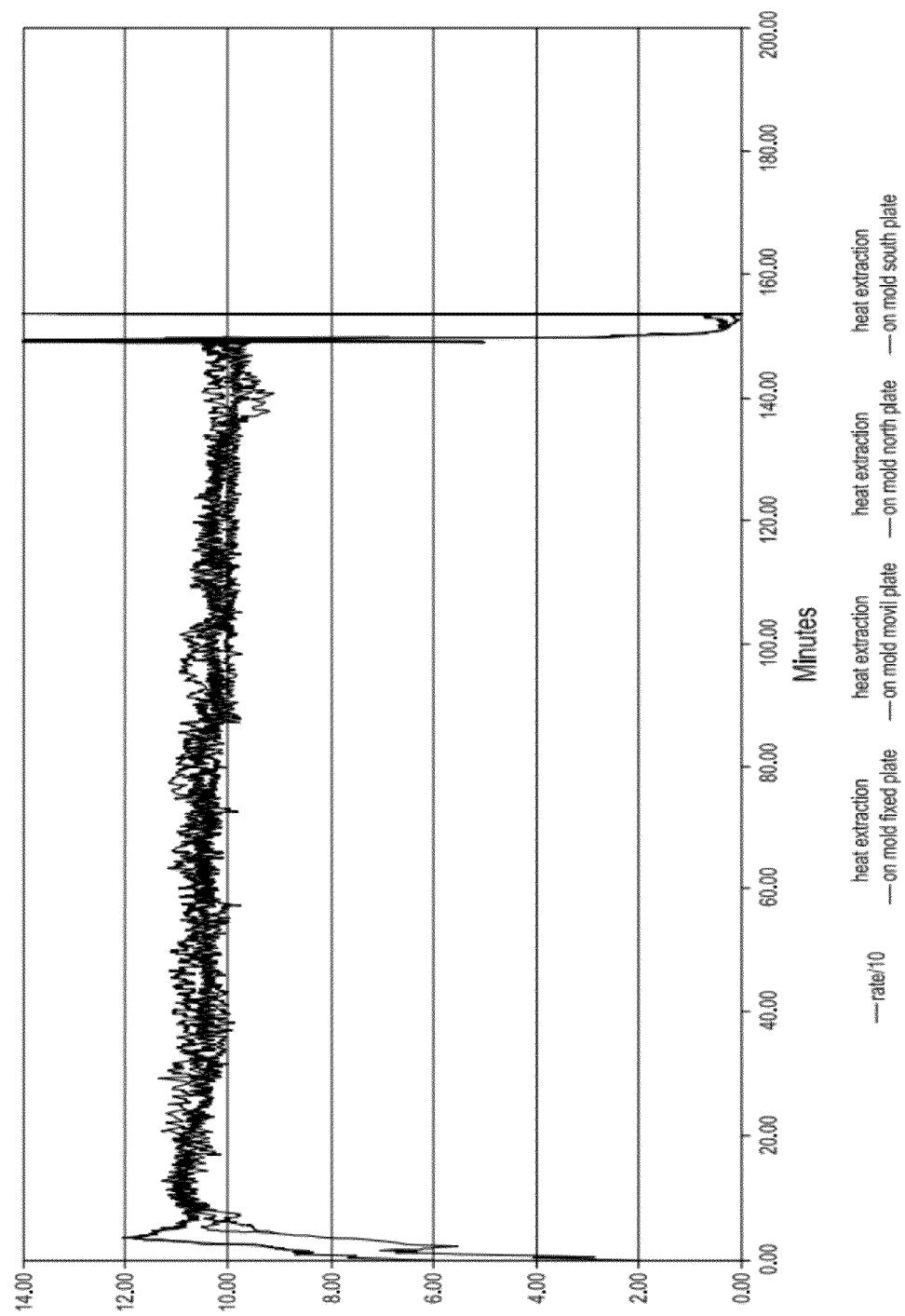
FIG. 7 is a plot of a second casting sequence illustrating the heat extraction of the mold as a function of time during embodiments of steel casting operations for Ti/B steel of the present disclosure.
Figure 8:
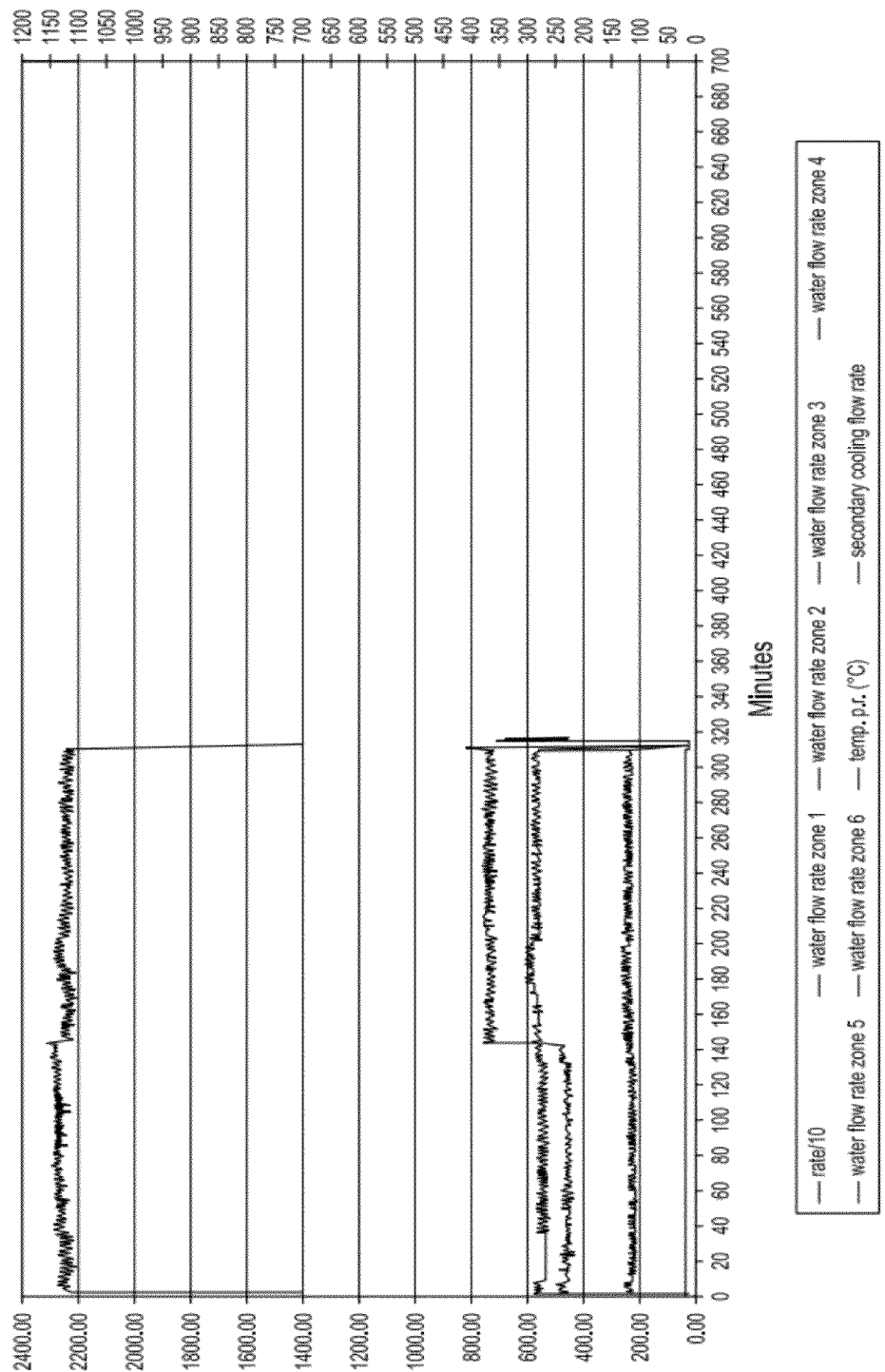
FIG. 8 is a plot illustrating the secondary heat extraction as a function of time during embodiments of steel casting operations for Ti/B steel of the present disclosure.

The steel was cast without breakouts and without indications of heat transfer problems that could have eventually led to breakouts or significant casting defects. FIGS. 6 and 7 illustrates heat flux during embodiments of the casting process for B/Ti heats, and FIG. 8 illustrates secondary cooling including water flow rate. There was a relationship of 80 to 110% for narrow faces/wide faces of the mold. The mold includes two narrow and two wide faces or plates to make up the walls of the mold. The heat extraction can vary between narrow and wide faces because the contraction during solidification can be more severe in the width direction making the separation between the steel and the mold larger along the narrow faces. This separation decreases the heat extraction rate. Both FIGS. 6 and 7 illustrate the heat transfer in the wide and narrow faces. The heat transfer in the wide faces is relatively stable compared to the narrow faces. The differences can be attributable to the taper adjustments made during casting. The instability of heat flux is of the same order of that observed for medium carbon steels without B and Ti additions.

Beneficially, the quality of the B/Ti steel cast in this manner was observed to be high. In one aspect, visual inspection of the cast B/Ti steel slabs determined that there was no indication of possible sticking or heat transfer problems that could eventually lead to breakouts or cracks. Further visual inspection did not observe any defects, such as uneven oscillation marks, sticking, cracks, etc. on the slab surface before entering the rolling process 120. In one embodiment, the steel casting is substantially free from cracks or significant defects.

In a further aspect, oscillation performed during the casting process did not appear to introduce defects into the cast slab. In one embodiment, cast steel slabs may have oscillation marks on the surface. Periodic mold oscillation helps to prevent sticking of the slab to the mold. If the slab sticks to the mold, however, cracks on the surface of the steel slab can form. Cracks can decrease the surface quality of the steel slab. Examination of the oscillation marks on the surface of the slab samples cast according to embodiments of the method 100 did not show any indication of sticking, or areas with non-well defined marks. Visual inspection and monitoring of the process variables for indirect determination were used to determine that there should not be any casting defects.

Figure 9:
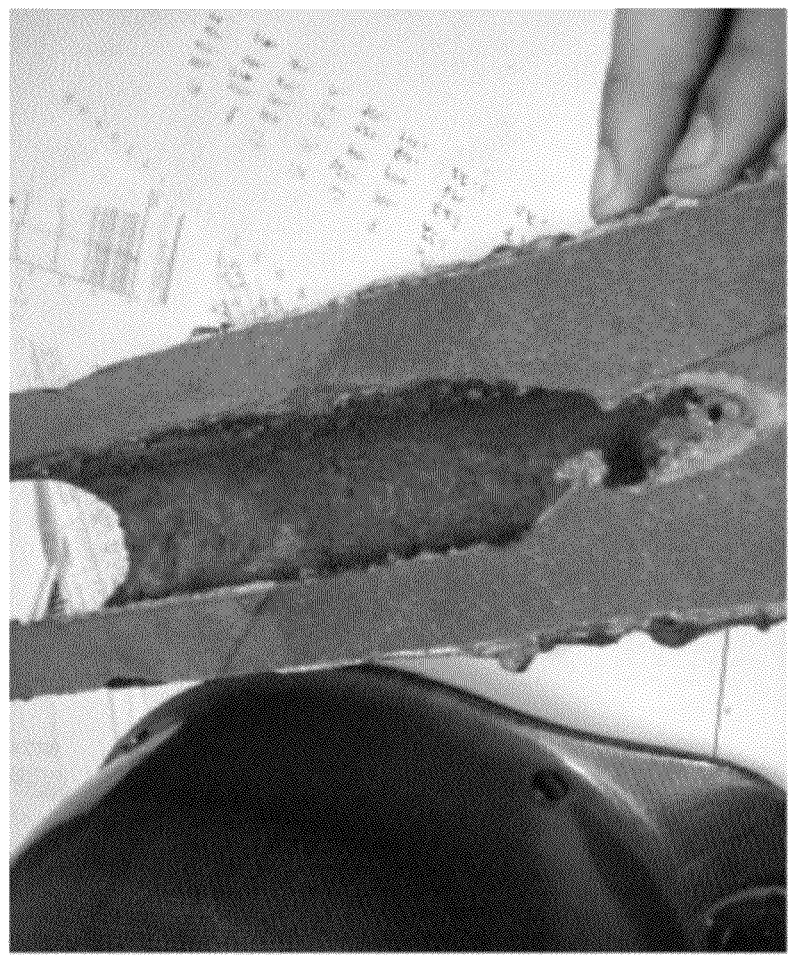
FIG. 9 is a photo image of one embodiment of a nozzle section of a thin slab caster (TSC) after casting of B/Ti steel.

The nozzle of the thin slab caster 113 was also examined to determine whether any clogging occurred. The nozzle in the thin slab caster 113 process desirably does not clog during the casting of the steel slab, as clogging is detrimental to the steelmaking process. For example, clogging may reduce the flow rate of molten steel through the casting system and can result in process interruption, or cleanliness problems if the clogging material is released into the steel. In addition, the released material from a clog could be entrapped in the mold powder and cause a local change in mold powder composition which could cause slab defects that are associated with heat transfer or lubrication problems. An embodiment of a cross-section of a thin slab caster nozzle after performing the steel-making process of the present disclosure is illustrated in FIG. 9. It may be observed from the cross-section that the walls of the interior passageway of the nozzle remain relatively free of obstruction, indicating that the nozzles did not experience any severe clogging. Stopper rod position monitoring also supports this observation.

Several samples of the slag rim formed during casting in the upper part of the mold were also analyzed under a scanning electron microscope (SEM) using EDAX in order to determine the chemical composition of the slag and, by inference, determine what, if any interactions between mold powder and the Ti in the steel occurred during the steel making process.

Figure 10:
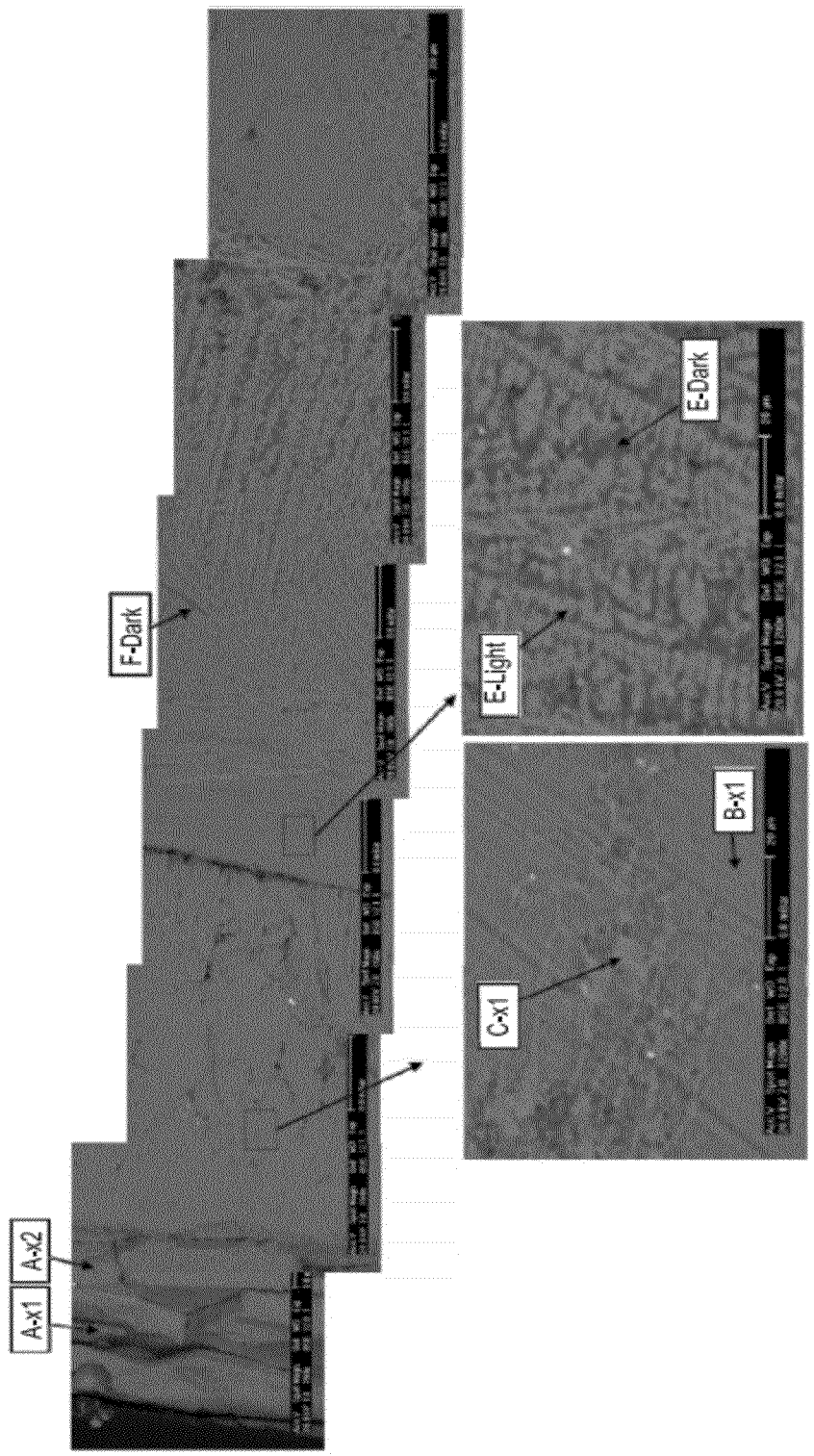
FIG. 10 is SEM images of one embodiment of the cross-section from a slag rim extracted after performing a B/Ti steel casting operation according to embodiments of the present disclosure.
Figure 11:
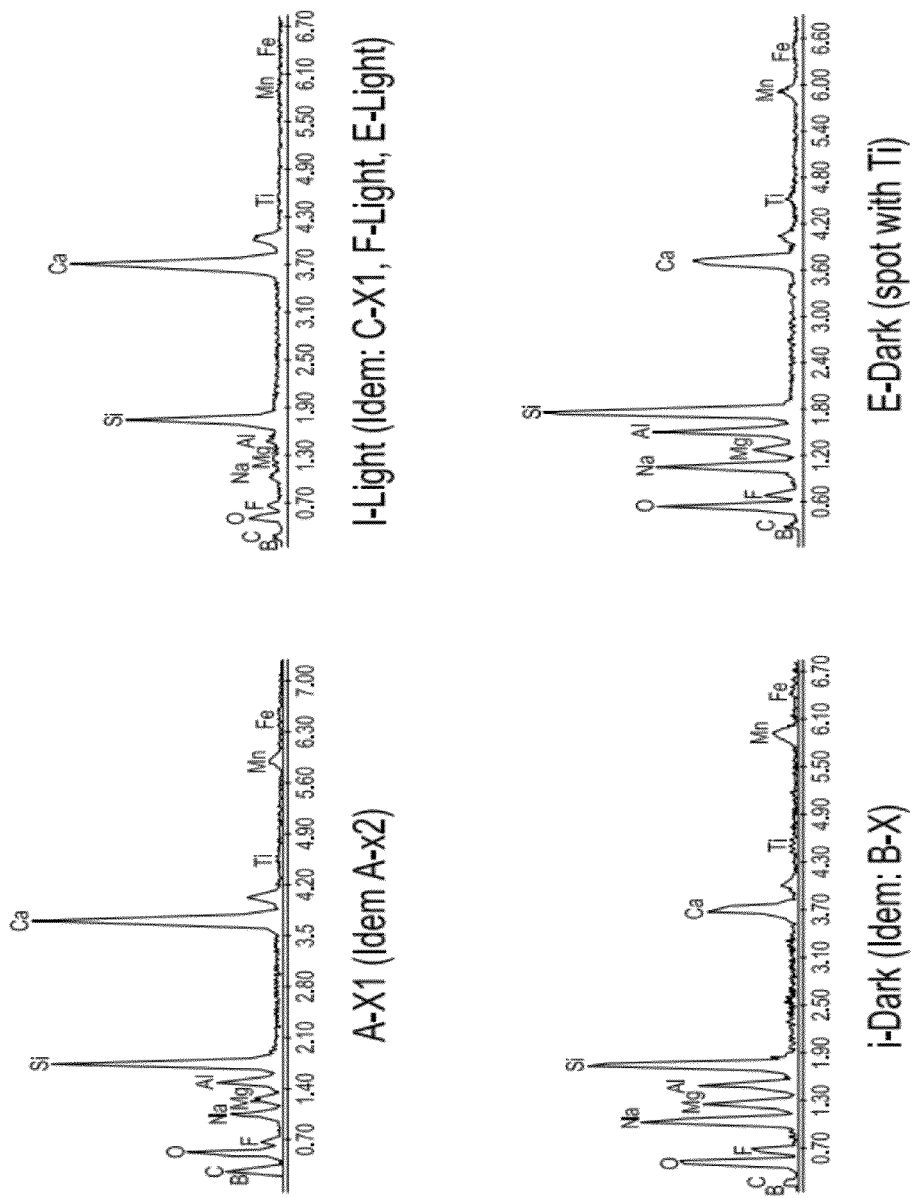
FIG. 11 is EDAX graphs of one embodiment of the cross section from a slag rim extracted after performing a B/Ti steel casting operation according to embodiments of the present disclosure.

FIG. 10 illustrates a cross section of the slag rim removed from a B/Ti heat after about 60 tons had been cast. Several energy dispersive spectroscopy (EDAX) analyses were performed in order to identify any phase containing Ti. Ti was analyzed to discover if the Ti in the steel was interacting with the mold powder. If Ti containing phases were found in the slag rim, this finding may indicate that the mold powder was having the effect of removing Ti from the steel. The spot analysis locations are marked in FIG. 10, and the main characteristic analyses of those spot analyses are illustrated in FIG. 11.

With the exception of one spot analysis, no traces of Ti or Ti containing particles were identified. The spot analysis that did show a small peak of Ti was not found in any other site of the sample, and that peak was not confined to any particular physical feature, such as a particle, crack, void, or etc. The weight percentage of Ti in the analysis of the small peak of Ti was approximately 1%.

The search for Ti containing phases was also extended to a slag rim sample from the same B/Ti heat that was extracted after about 80 tons were cast. No Ti was found.

From the slag analyses, it may be concluded that the small Ti concentration of the tested steels is not sufficiently high to result in a bulk mold powder composition change. Therefore, in certain embodiments, the mold powder substantially does not remove titanium from the steel composition.

Samples were also extracted from the steel slab from the heat (B/Ti steel) in order to verify that the chemical composition was in accordance with that of Table I. The samples were tested in three trials and the resulting analyses are illustrated in Table II. For trial 3, N determination could not be performed. It may be observed that the elements are approximately within the range of elemental compositions specified by Table I. Furthermore, the Ti/N ratio was above the desired values illustrated in Table I. It is advantageous for the Ti/N ratio to be sufficiently high in order to prevent boron in the steel from forming boron nitrides.

TABLE II

Chemical analysis of heat.

|    | Trial 1 (wt %) | Trial 2 (wt %) | Trial 3 (wt %) |
|----|----------------|----------------|----------------|
| C  | 0.2448         | 0.24           | 0.258          |
| Mn | 1.3626         | 1.33           | 1.2887         |
| P  | 0.0101         | 0.009          | 0.011          |
| S  | 0.0019         | 0.002          | 0.0006         |
| Cu | 0.0243         | 0.03           | 0.023          |
| Ni | 0.0062         | 0.01           | 0.0089         |
| Si | 0.1635         | 0.17           | 0.156          |
| Cr | 0.0104         | 0.01           | 0.012          |
| Nb | 0.0003         | 0.001          | 0.002          |
| Al | 0.0263         | 0.035          | 0.028          |
| Ti | 0.0222         | 0.027          | 0.022          |
| Mo | 0.0018         | —              | 0.004          |
| V  | 0.0033         | 0.004          | 0.006          |
| Ca | 0.0024         | 0.0027         | —              |
| Sn | 0.0026         | 0.002          | 0.006          |
| N  | 0.0049         | 0.0052         |                |
| B  | 0.0025         | 0.0017         | 0.0014         |

In one embodiment, after the steel slabs are produced from the steelmaking operations 101, the steel slabs can go through steel forming operations 102 before going through the heat treatment operations 103. The steel forming operations 102 may include, but are not limited to, rolling 120 and pipe forming 121.

In one embodiment, cast steel slab is rolled into coils after temperature homogenization in an intermediate furnace. The cast slab is rolled into coils. In some embodiments, the coil thickness ranges between about 0.15 to 0.5 inches. The coils are slitted into smaller coils. The smaller coils are used for the forming of pipes of different diameters. In certain embodiments, the forming of pipe comprises a welding operation.

The pipe can be heat treated to obtain desired mechanical properties. For example, prior to heat treatment, the yield strength, the ultimate tensile strength and the elongation at failure of the pipe can be greater than 60 or about 60 ksi, greater than 75 or about 75 ksi and greater than 25% or about 25%, respectively. The pipe can be quenched from a temperature of less than about 1,650° F.+/−30° F. The quenched pipe can have a hardness greater than 45 or about 45 HRC. The quenched pipe can be tempered at a temperature of about 1,100° F.+/−30° F. The yield strength, ultimate tensile strength, elongation at failure, hardness, collapse pressure of the tempered pipe can be greater than 120 or about 120 ksi, greater than 125 or about 125 ksi, greater than 19% or about 19%, greater than 25 or about 25 HRC and greater than 8,500 or about 8,500 psi, respectively. Alternatively, the quenched pipe can be tempered at a temperature of about 1,320° F.+/−30° F. The yield strength, ultimate tensile strength, elongation at failure and hardness of the tempered pipe can be greater than 95 or about 95 ksi, greater than 105 or about 105 ksi, greater than 23% or about 23% and greater than 16 or about 16 HRC, respectively.

B/Ti steels cast from a thin slab caster were expected to suffer from cracking which would result in low surface quality and defects. However, the amount of rejected pipes from the trial heat due to thin slab caster was only 0.8% or 2 pipes out of 245. Therefore, B/Ti steels cast from a thin slab caster were substantially free from cracks or significant defects.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings.

What is claimed is:

1. A method of manufacturing a steel product, comprising:
   providing a steel composition comprising boron and titanium;
   casting the steel composition into a slab having a thickness between about 25 and 150 mm, wherein said steel composition and casting parameters for casting the steel composition are selected to produce a cast steel substantially free from cracks or other structural defects, wherein the slab has a cast composition comprising:
   about 0.23 to 0.30 wt. % carbon;
   about 0.001 to 0.005 wt. % boron, said about 0.001 to 0.005 wt. % boron being free boron;
   about 0.010 to 0.050 wt. % titanium;
   about 1.15 to 1.50 wt. % manganese;
   less than about 0.35 wt. % silicon;
   a Ti/N ratio greater than about 2.9;
   wherein the amount of each element is provided based upon the total weight of the cast composition; and
   wherein said selected casting parameters to produce a cast steel substantially free from cracks or other structural defects comprise casting the steel composition into a slab at a rate of up to about 4.3 m/min.

2. The method of claim 1, wherein the cast composition further comprises about 0.010 to 0.070 wt. % aluminum.

3. The method of claim 1, wherein the cast composition consists essentially of:
   about 0.23 to 0.30 wt. % carbon;
   about 0.001 to 0.005 wt. % boron, said about 0.001 to 0.005 wt. % boron being free boron;
   about 0.010 to 0.050 wt. % titanium;
   about 1.15 to 1.50 wt. % manganese;
   less than about 0.35 wt. % silicon;
   the balance being iron and incidental impurities;
   wherein the amount of each element is provided based upon the total weight of the cast composition; and
   wherein a Ti/N ratio is greater than about 2.9.

4. The method of claim 1, wherein the cast composition comprises:
   about 0.23 to 0.29 wt. % carbon;
   about 0.001 to 0.005 wt. % boron, said about 0.001 to 0.005 wt. % boron being free boron;
   about 0.010 to 0.045 wt. % titanium;
   about 1.15 to 1.50 wt. % manganese;
   less than about 0.35 wt. % silicon;
   less than about 0.025 wt. % phosphorus;
   less than about 0.01 wt. % sulfur;
   about 0.010 to 0.07 wt. % aluminum;
   less than about 0.010 wt. % nitrogen;
   less than about 0.2 wt. % nickel;
   less than about 0.2 wt. % chromium;
   less than about 0.11 wt. % molybdenum;
   less than about 0.01 wt. % vanadium;
   less than about 0.01 wt. % niobium;
   less than about 0.005 wt. % calcium;
   less than about 0.25 wt. % copper;
   less than about 0.02 wt. % tin;
   a Ti/N ratio greater than about 2.9; and
   wherein the amount of each element is provided based upon the total weight of the cast composition.

5. The method of claim 1, wherein the thickness of the slab is about 30 to 100 mm.

6. The method of claim 1, wherein the width of the slab is about 915 to 1370 MM.

7. The method of claim 1, wherein the casting the steel composition into a slab is done at a rate above about 3.8 m/min.

8. The method of claim 1, wherein the casting the steel composition into a slab is done at a rate of about 1.5 to 3.5 ton/min.

9. The method of claim 1, wherein said selected casting parameters to produce a cast steel substantially free from cracks or other structural defects comprise:
   transporting the steel composition into a tundish;
   maintaining the steel composition at a temperature of about 1510 to 1595° C. in a tundish;
   flowing the steel composition from the tundish through a nozzle and into a water-cooled mold; and
   exiting the slab from the mold.

10. The method of claim 1, wherein casting the steel composition further comprises adding a mold powder to the steel composition and wherein the mold powder comprises calcium aluminate.

11. The method of claim 10, wherein the mold powder substantially does not remove titanium from the steel composition.

12. The method of claim 1, further comprising forming the slab into a pipe.

13. The method of claim 12, wherein forming the slab into a pipe comprises a welding operation.

* * * * *

UNITED STATES PATENT AND TRADEMARK OFFICE
CERTIFICATE OF CORRECTION

PATENT NO. : 8,221,562 B2
APPLICATION NO. : 12/626547
DATED : July 17, 2012
INVENTOR(S) : Valdez et al.

Page 1 of 1

It is certified that error appears in the above-identified patent and that said Letters Patent is hereby corrected as shown below:

Page 1 (item 75, Inventors) at line 1-2, Change "Cindad Autónomoa de Buenos Aires (AR);" for Martin Emiliano Valdez to --Ciudad Autónoma de Buenos Aires (AR);--.

In column 2 (page 1 item 56) at line 12, Under Other Publications, change "artic" to --arctic--.

In column 2 (page 2 item 56) at line 53, Under Other Publications, change "Y . Lou" to --Y. Lou,--.

In column 1 (page 3 item 56) at line 29, Under Other Publications, change "Pergamom" to --Pergamon--.

In column 1 (page 3 item 56) at line 29, Under Other Publications, change "Spinger-Verlag," to --Springer-Verlag,--.

In column 2 (page 3 item 56) at line 32, Under Other Publications, change "Geochemica et Cosmochemica" to --Geochimica et Cosmochimica--.

In column 2 (page 3 item 56) at line 46, Under Other Publications, change "Tempuratures"," to --Temperatures",--.

In column 2 (page 3 item 56) at line 57, Under Other Publications, change "Perganom" to --Pergamon--.

In column 7 at line 47, Change "samples" to --10 samples--.

In column 10 at line 45, Change "hardeness" to --hardness--.

In column 12 at line 20, In Claim 6, change "MM." to --mm.--.

Signed and Sealed this
Eighteenth Day of December, 2012

David J. Kappos
*Director of the United States Patent and Trademark Office*